United States Patent
Netzer

(10) Patent No.: US 10,457,316 B2
(45) Date of Patent: Oct. 29, 2019

(54) COMPACT STEERING

(71) Applicant: Yoav Netzer, Moers (DE)

(72) Inventor: Yoav Netzer, Moers (DE)

(73) Assignee: Yoav Netzer, Moers (DE)

( * ) Notice: Subject to any disclaimer, the term of this patent is extended or adjusted under 35 U.S.C. 154(b) by 0 days.

(21) Appl. No.: 15/549,160

(22) PCT Filed: Jul. 5, 2016

(86) PCT No.: PCT/IB2016/054014
§ 371 (c)(1),
(2) Date: Aug. 6, 2017

(87) PCT Pub. No.: WO2018/007848
PCT Pub. Date: Jan. 11, 2018

(65) Prior Publication Data
US 2019/0111963 A1    Apr. 18, 2019

(51) Int. Cl.
*B62D 1/04* (2006.01)
*B62D 1/12* (2006.01)
(Continued)

(52) U.S. Cl.
CPC ............... *B62D 1/22* (2013.01); *B62D 1/02* (2013.01); *B62D 1/04* (2013.01); *B62D 1/12* (2013.01); *B62D 1/14* (2013.01)

(58) Field of Classification Search
CPC . B62D 1/04; B62D 1/043; B62D 1/12; B62D 1/14; B62D 1/22; B62D 1/02
See application file for complete search history.

(56) References Cited

U.S. PATENT DOCUMENTS 3,176,537 A    4/1965 Zeigler
3,282,124 A *  11/1966 Peterson ............... B62D 1/04
                                          280/778
(Continued)

FOREIGN PATENT DOCUMENTS

FR         149360 A    8/1967

OTHER PUBLICATIONS

International Search Report and Written Opinion dated Apr. 13, 2017 issued in the corresponding International PCT Application serial No. PCT/IB2016/054014 filed Jul. 5, 2016.
(Continued)

*Primary Examiner* — Luis A Gonzalez
(74) *Attorney, Agent, or Firm* — A.C. Entis-IP Ltd.; Allan C. Entis; Kenichi N Hartman

(57) ABSTRACT

A vehicle steering input device comprising: a first knob (102) configured to be rotatable around a first axis of rotation and operatively coupled to a steering column (200) so that rotating the first knob (102) results in rotation of the steering column (200); and a second knob (1112) configured to be rotatable around a second axis of rotation and operatively coupled to rotate the steering column (200) so that rotating the second knob (112) results in rotating the steering column (200), wherein the first and second rotatable knobs (102, 112) are operatively coupled so that rotating one knob (102; 112) in a clockwise (CW) or counter clockwise (CCW) direction results in rotating the other knob (112; 102) in a same direction, and the first axis of rotation and the second axis of rotation define an angle.

16 Claims, 6 Drawing Sheets

(51) Int. Cl.
*B62D 1/22* (2006.01)
*B62D 1/14* (2006.01)
*B62D 1/02* (2006.01)

(56) References Cited

U.S. PATENT DOCUMENTS

| | | | |
|---|---|---|---|
| 3,312,123 A | 4/1967 | Rumpf | |
| 5,755,142 A * | 5/1998 | Jacoby | B62D 1/04 280/778 |
| 7,726,692 B2 * | 6/2010 | Ozaki | B62D 1/04 280/778 |
| 8,960,043 B2 * | 2/2015 | Kimura | B62D 1/02 280/778 |

OTHER PUBLICATIONS

"Will a Twist of the Wrist Steer Your Next Car?"; Popular Science, vol. 186 No. 4; Apr. 1965; p. 89; Downloaded Mar. 23, 2016: https://books.google.co.il/books?id=AiYDAAAAMBAJ&lpg=PA89 &dq=%22wrist%20twist%22%20mercury&pg=PA89#v=onepage &q&f=false.

* cited by examiner

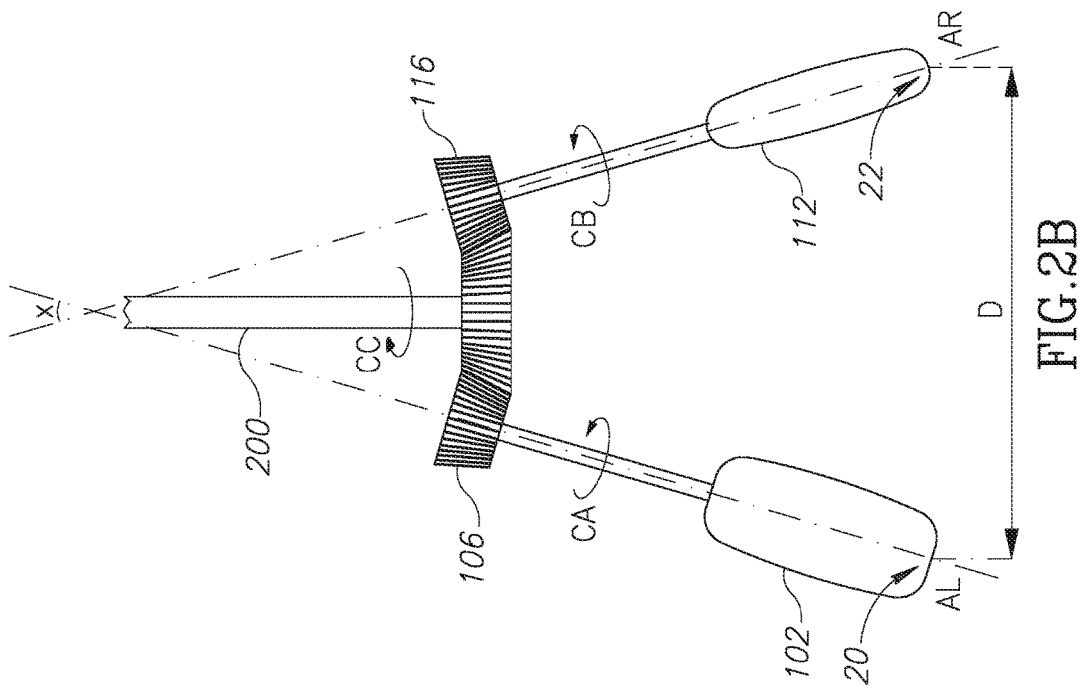
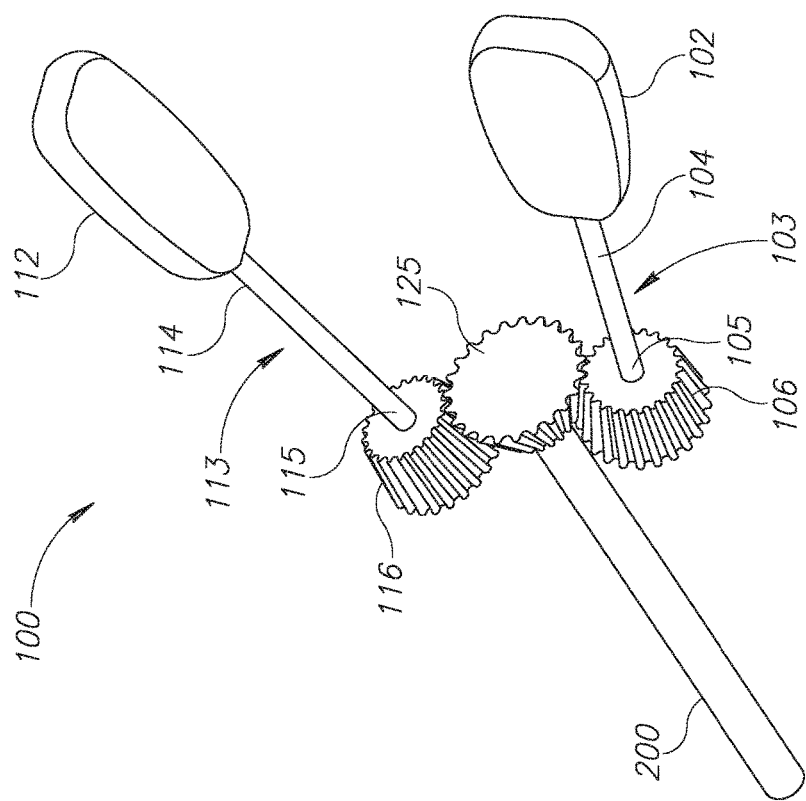
FIG.2A
FIG.2B

COMPACT STEERING

RELATED APPLICATIONS

The present application is a U.S. National Phase of PCT Application No. PCT/IB2016/054014, filed on Jul. 5, 2016. The contents and disclosures of this prior application is incorporated herein by reference in its entirety.

TECHNICAL FIELD

Embodiments of the disclosure relate to a vehicle steering device.

BACKGROUND

A role of a conventional steering mechanism in a vehicle is to turn wheels of the vehicle using a steering wheel typically positioned in front of a driver and operated by one or two hands by the driver. Rotation of the steering wheel is typically transferred via a steering column to a wheel-guiding mechanism that points the wheels in a desired direction responsive to the steering wheel rotation. The steering column may comprise universal joints to allow it to deviate from a straight line while maintaining its ability to transfer rotational motion from the steering wheel to the wheel-guiding mechanism. Modern automobiles typically use a rack and pinion wheel-guiding mechanism, in which rotating the steering wheel rotates a pinion gear coupled to a rack, which is a linear gear that meshes with the pinion and converts rotation of the pinion into linear motion of the rack along the transverse axis of the car (side to side motion). Other wheel-guiding mechanisms include the recirculating ball mechanism. A conventional steering mechanism may comprise a power assisted steering (PAS) system, in which hydraulic or electric actuators add controlled energy to the steering mechanism. When using a steering mechanism comprising a PAS, the driver needs to provide less effort in order to turn the steered wheels when driving at typical speeds, and reduce considerably the physical effort necessary to turn the wheels when a vehicle is stopped or moving slowly.

The steering wheel has been a favoured steering device due to a number of advantages, including precision, feedback, and stability. A steering wheel with several turns from lock to lock allows for much more precision for control for a range of turn angles for the front wheel, from making large angle changes when parallel parking to making fine, to small angle changes while speeding down a highway. A steering wheel mechanically coupled to the wheels provides direct mechanical feedback allowing that the driver to "feel" forces affecting the turning of the front wheels. A steering wheel can only be moved by means of rotation, thus it is relatively resistant to registering unintended movement due to inertial motion that a driver experiences relative to the steering wheel during driving.

SUMMARY

An aspect of an embodiment of the disclosure relates to providing a vehicular steering device, hereinafter also referred to as a "Twist Controller" that is more compact than a steering wheel while providing the precision, feedback and/or stability advantages that a steering wheel provides.

A Twist Controller in accordance with an embodiment of the disclosure comprises a first rotatable knob configured to be rotatable around a first axis of rotation and a second rotatable knob configured to be rotatable around a second axis of rotation, and the Twist Controller is configured such that rotation of one or both of the rotatable knobs controls steering of a vehicle. In an embodiment of the disclosure, rotation of one or both of the rotatable knobs rotates a steering column operatively coupled thereto. Optionally, the knobs are mechanically coupled to the steering column, by way of example via gears. Alternatively or additionally, the Twist Controller comprises an electronic rotation controller configured to register rotation of one or both knobs and control powered rotation of the steering column responsive to knob rotation.

In an embodiment of the disclosure, the first and second rotatable knobs are operatively coupled such that rotating one knob results in the other knob being rotated in the same rotational direction. Thus a clockwise ("CW") rotation of one knob causes a CW rotation of the other knob and a counter-clockwise ("CCW") rotation of one knob causes a CCW rotation of the other knob.

As used herein, direction of rotation, for example CW or CCW rotation, is to be understood to be with reference to each knob being viewed along the respective axis of rotation from a distal end of the respective knob.

In an embodiment of the disclosure, the first and second axes of rotation define an angle (which may be referred to herein as an "interknob angle"). Optionally, the interknob angle is between 180 degrees and 10 degrees. Optionally, the interknob angle is between 170 degrees and 10 degrees, between 160 degrees and 20 degrees, between 150 degrees and 30 degrees, between 140 degrees and 40 degrees, between 130 degrees and 50 degrees, between 120 degrees and 60 degrees, or between 110 degrees and 70 degrees. Optionally, the interknob angle is about 90 degrees.

In an embodiment of the disclosure, orientation of the first and second rotatable knobs around their respective axes of rotation are offset by 90 degrees between each other, and the offset remains 90 degrees regardless of angular displacement of the knobs around their respective axes of rotation. By way of example, if a reference point on the first knob is at a 12 o'clock position, then an equivalent reference point on the second knob is at a 3 o'clock position, and if the respective reference point of the first knob is rotated to a 2 o'clock position, then the equivalent reference point on the second knob is simultaneously rotated to a 5 o'clock position.

In an embodiment of the disclosure, the Twist Controller is operable to apply feedback torque to the first and second knobs responsive to force applied to the steering mechanism. Optionally, the Twist Controller is operative to apply the feedback torque through mechanical coupling of the knobs with the steering column. Alternative or additionally, the Twist Controller comprises an electrical feedback actuator that applies torque to the first and/or second knobs responsive to force applied to the steering mechanism.

In an embodiment of the disclosure, rotation of one or more rotatable knobs does not result in translational motion of the same or the other rotatable knob.

In an embodiment of the disclosure, a distance (which may be referred to herein as an "interknob distance") between the respective distal ends of the first and second knobs is about the width of a driver's shoulders or less, less than 60 centimeters (cm), less than 45 cm, less than 30 cm, less than 25 cm, less than 20 cm, less than 15 cm, or less than 10 cm.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIG. 2A shows a schematic illustration of a Twist Controller in accordance with an embodiment of the disclosure;

FIG. 2B shows a top view of the Twist Controller shown in FIG. 2A;

DETAILED DESCRIPTION

Figures 1A, 1B:
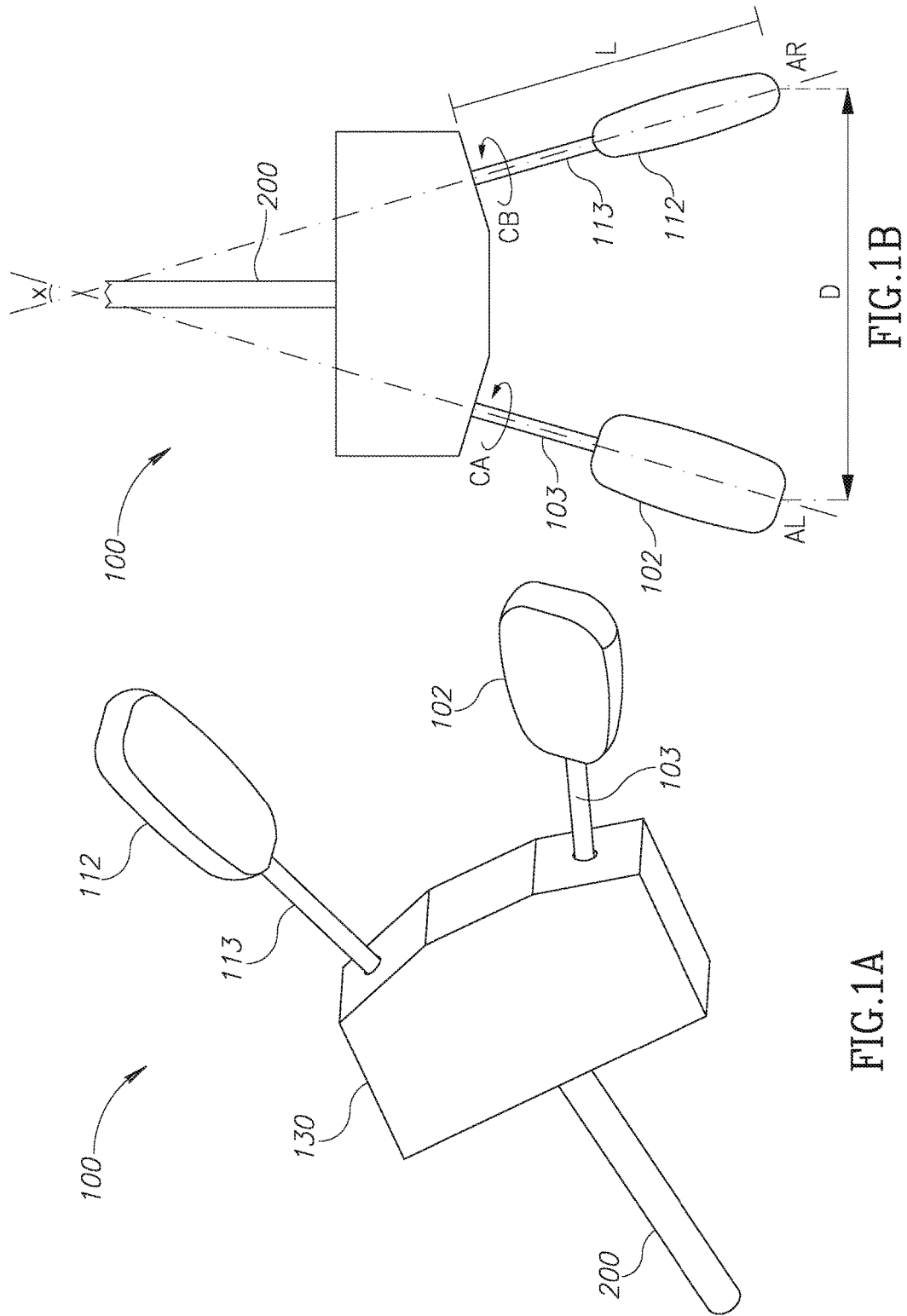
FIG. 1A shows a schematic illustration of a Twist Controller in accordance with an embodiment of the disclosure.
FIG. 1B shows a top view of the Twist Controller shown in FIG. 1A.

Reference is made to FIGS. 1A and 1B, which show schematic illustration of a Twist Controller 100 in accordance with an embodiment of the disclosure. Twist Controller 100 comprises a left knob 102 and a right knob 112. Optionally, Twist Controller 100 comprises shaft 103 that connects left knob 102 to body 130 and shaft 113 that connects right knob 112 to body 130. Left knob 102 is rotatable around axis AL and right knob 112 is rotatable around axis AR. In an embodiment of the invention, Twist Controller 100 may be configured such that rotation of one or both of knobs 102, 112 around their respective axes of rotation is operable to control steering of a vehicle to which Twist Controller 100 is installed. By way of example, Twist Controller 100 may be comprised in an automobile 500 (see FIG. 5), and Twist Controller may be configured so that when a driver of the automobile rotates one or both knobs 102, 112 in a CW direction, automobile 500 is steered to turn right, and when the driver rotates one or both of knobs 102, 112 in a CCW direction, automobile is steered to turn left.

In an embodiment of the disclosure, knobs 102 and 112 are rotationally coupled such that when one knob is rotated, the other knob rotates in a same rotational direction and rotational distance. The relationship between the rotational directions is schematically represented by arrow CA for knob 102 and arrow CB for knob 112. By way of example, Twist Controller is configured so that rotating one knob 90 degrees in the CW direction causes the other knob to rotate 90 degrees in the CW direction. Alternatively, a 90 degree CCW rotation of one knob causes the other knob to also rotate 90 degrees in the CCW direction. In an embodiment of the disclosure, knobs 102 and 112 are operatively coupled to a steering column 200 such that CW rotation of knobs 102 and/or 112 causes rotation of steering column 200 in one rotational direction, and CCW rotation of knobs 102 and/or 112 causes rotation of steering column 200 in the other rotational direction. Embodiments of the rotational coupling between knob 102, knob 112 and steering column 200 is described further hereinbelow.

In an embodiment of the invention, movement of knobs 102, 112 during operation of the twist controller is restricted to rotation around rotational axes AL and AR, respectively. By way of example, rotation of knobs 102, 112 does not result in translational motion of AL or AR with respect to body 130 and/or steering column 200.

In an embodiment of the disclosure, Twist Controller 100 is configured such that axes AL and AR define an angle X, which may be referred to hereinafter as interknob angle X. Optionally, interknob angle X is between 180 degrees and 10 degrees. Optionally, interknob angle X is between 170 degrees and 10 degrees, between 160 degrees and 20 degrees, between 150 degrees and 30 degrees, between 140 degrees and 40 degrees, between 130 degrees and 50 degrees, between 120 degrees and 60 degrees, or between 110 degrees and 70 degrees. Optionally, interknob angle X is about 90 degrees. Optionally, the interknob angle X may be adjustable for an individual driver's optimal comfort.

The use of knobs rather than a wheel for controlling steering allows for a Twist Controller in accordance with an embodiment of the disclosure to be compact relative to a conventional steering wheel. In an embodiment of the disclosure, Twist Controller 100 and its components are dimensioned such that an interknob distance D between the distal ends of the two knobs is about the width of a driver's shoulders or less. Optionally, interknob distance D is less than 60 centimeters (cm), less than 45 cm, less than 30 cm, less than 25 cm, less than 20 cm, less than 15 cm, or less than 10 cm. Optionally, the distal end of knob 102 is a point 20 (shown in FIG. 2B) where axis AL crosses an outer surface of knob 102 and the distal end of knob 112 is a point 22 (shown in FIG. 2B) where axis AR crosses an outer surface of knob 112.

In an embodiment of the disclosure, length L of the knob, measured as the distance between the distal end of a knob 102 or 112 and body 130 of the Twist Controller is adjustable. Optionally the length of shaft 103, 113 may be adjustable. By way of example, shaft 103 and knob 102 may be configured so that shaft 103 is slidable into knob 102 to shorten knob length L. It will be appreciated that, in an embodiment of the disclosure, for a given interknob angle X, shortening knob length L for the two knobs results in a shortened interknob distance D. As such, shortening knob length L for the knobs results in a shortened interknob distance D as well. It will also be appreciated that, in an embodiment of the disclosure, a distance between shafts 103 and 113 at body 130 is less than interknob distance D between the handle tips, and the relationship between the two distances is a function of interknob angle X and knob length L. Optionally, length L may be about 30 cm or less, less than 20 cm, less than 10 cm, less than 5 cm or less than 2 cm. Optionally, a width of knobs 102, 112, which may be defined as a longest distance traversed through a knob by a line intersecting perpendicularly with the respective knobs' axis of rotation, may be about 10 cm or less, less than 8 cm, less than 6 cm, or less than 4 cm.

In an embodiment of the disclosure, each of knobs 102, 112 are shaped and dimensioned to be easily held and rotated with a user's hand or fingers. Optionally, knobs 102, 112 may have a substantially flattened shape as shown in FIGS. 1A-1B, or alternatively a substantially rounded shape. Optionally, Knobs 102, 112 may comprise ribbing, a series of indentations and/or a rubber-like surface for improved grip.

Figure 1C:
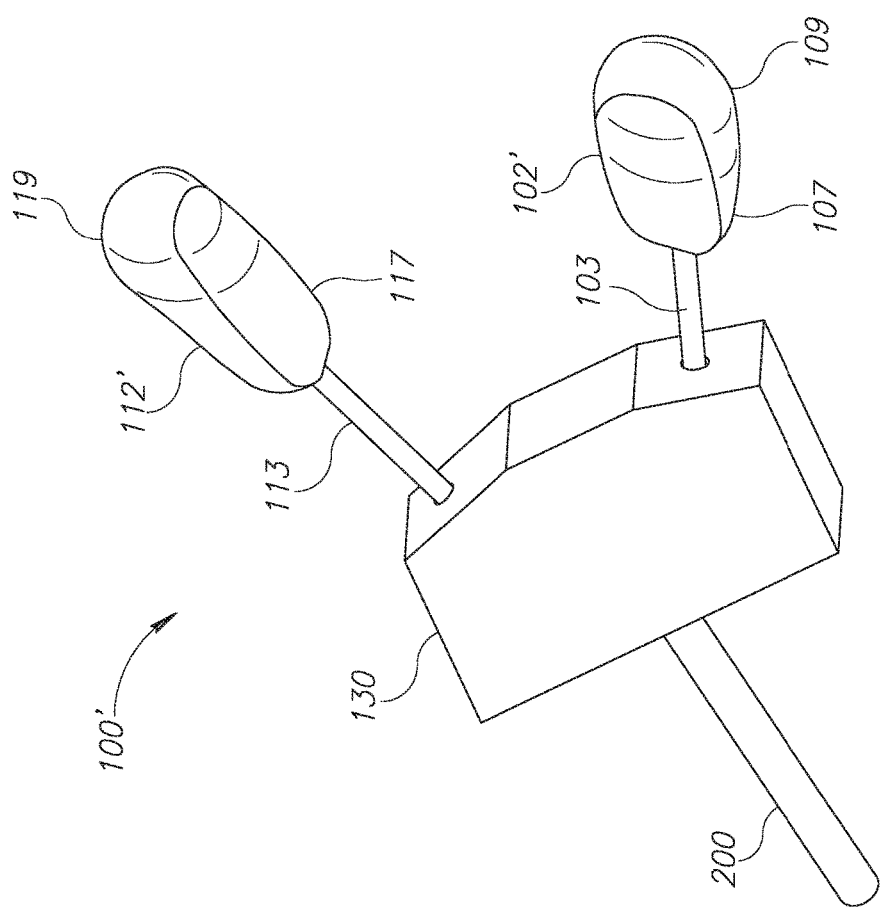
FIG. 1C shows an alternative Twist Controller comprising alternative knobs.

Reference is now made to FIG. 1C. In an embodiment of the disclosure, a distal portion 109 of alternative knob 102' has a rounded shape relative to a proximal portion 107 of knob 102' and the proximal portion has a flattened shape relative the distal portion. As shown in FIG. 1C, rounded shape of distal portion 109 is advantageously shaped to be comfortably gripped within a user's hand palm, while the flattened shape of proximal portion 107 is advantageously shaped for applying torque on knob 102' with the user's fingers. FIG. 1C also shows a distal portion 119 of alternative knob 112' that is rounded relative to a proximal portion 117 of knob 112', with proximal portion being more flat relative to the distal portion.

In an embodiment of the disclosure, each rotatable knob 102, 112 has mirror symmetry along at least one plane of symmetry. Optionally, each rotatable knob 102, 112 has mirror symmetry along two planes of symmetry.

In an embodiment of the disclosure, each knob 102, 112 is shaped having order 2 rotational symmetry such that the knob has a same appearance after being rotated 180 degrees around the rotation axis.

In an embodiment of the disclosure, knob 102 and knob 112 have the same shape as each other or are enantiomorphs to each other.

FIGS. 2A-2B, 3 and 4A-4E schematically illustrate various embodiments of rotational coupling between knob 102, knob 112 and steering column 200.

Reference is made to FIGS. 2A and 2B, which shows Twist Controller 100 without outer body 130, and schematically illustrates an optional internal mechanism within body 130 for providing rotational coupling between knob 102, knob 112 and steering column 200. In an embodiment of the disclosure, left knob 102 is connected to distal end 104 of shaft 103, and a proximal end 105 of shaft 103 is connected to a bevel gear 106, such that rotation of left knob 102 results in rotation of bevel gear 106. Moreover, right knob 112 is connected to a distal end 114 of shaft 113, and a proximal end 115 of shaft 113 is connected to a bevel gear 116, such that rotation of right knob 102 results in rotation of bevel gear 116. Bevel gears 106 and 116 are operatively coupled to a central bevel gear 125 that is connected to a steering column 200, such that rotation of one or both of knobs 102 and 112 results in rotation of steering column 200. Because knob 102 and knob 112 are each rotationally coupled through respective bevel gears to steering column 200 rotation of one of knobs 102 or 112 results in rotation of the other knob in a same rotational direction and rotation of steering column 200 in an opposite rotational direction. The relationship between the rotational directions is schematically represented by arrow CA for knob 102, arrow CB for knob 112 and arrow CC for steering column 200. In an embodiment of the disclosure, steering column 200 may comprise or be operatively connected to additional gear mechanisms (not shown in FIGS. 2A-2B) to reverse the rotational direction of the steering column so that is remains the same direction as knobs 102 and 112. In an embodiment of the disclosure, the additional gear mechanisms may be configured to have a reducing gear ratio in order to reduce torque required by a driver's hands for steering. By way of example (as shown in FIGS. 2A-2B), the radius of bevel gears 106 and 116 may be small relative to bevel gear 125 to have the reducing gear ratio.

Figure 3:
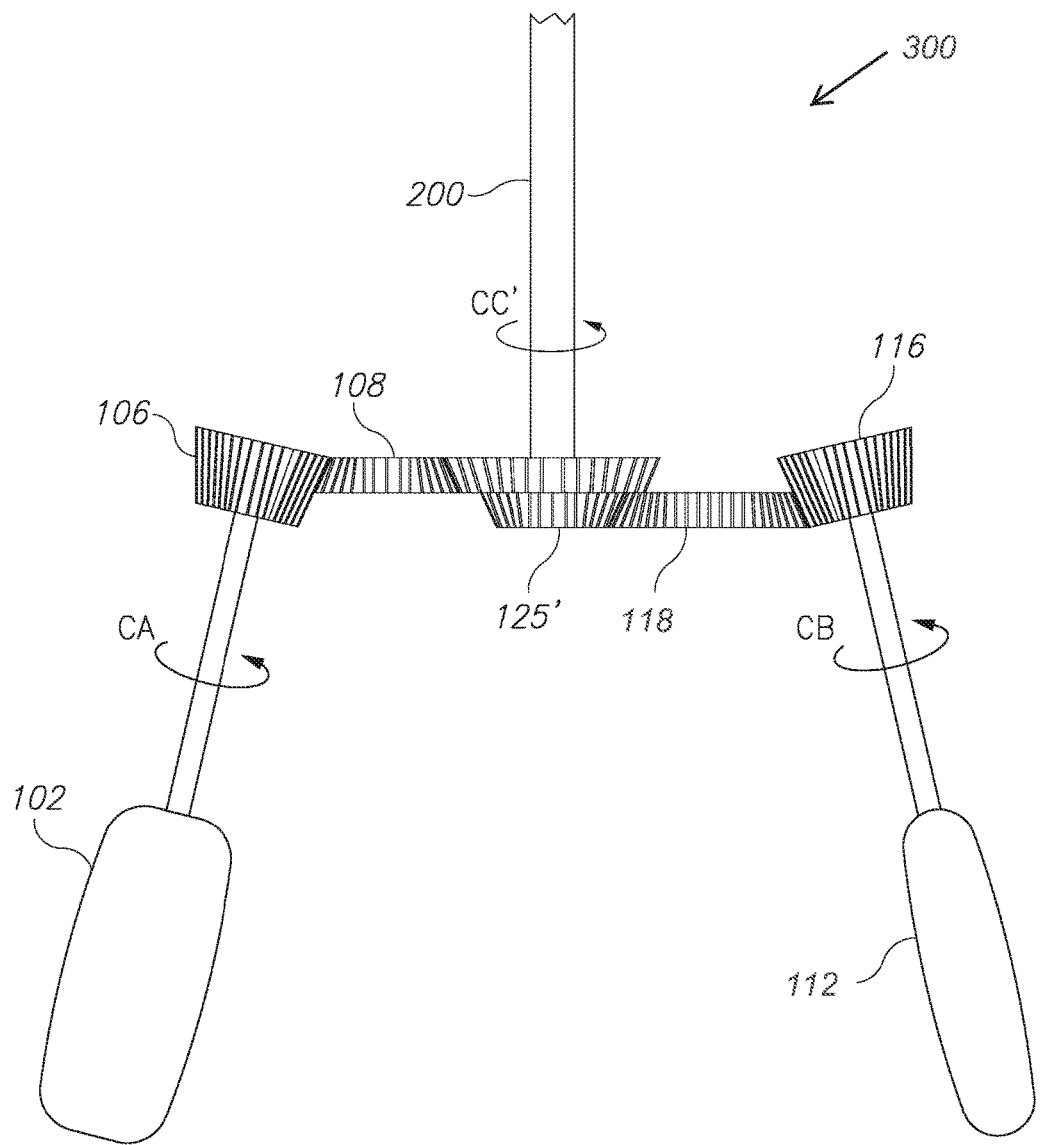
FIG. 3 shows a schematic illustration of an alternative Twist Controller in accordance with an embodiment of the disclosure.

Reference is made to FIG. 3, which schematically illustrates an alternative Twist Controller 300 shown without outer body 130. Twist Controller is substantially the same as Twist Controller 100 as shown in FIGS. 1A-1B and 2A-2B, with the exception that it comprises an additional gear between the bevel gear connected to the shaft and the bevel gear connected to the steering column. As shown in FIG. 3, bevel gear 106 is operatively coupled to intermediate gear 108, which is operatively coupled to bevel gear 125', and bevel gear 116 is operatively coupled to intermediate gear 118, which is operatively coupled to bevel gear 125'. As such, rotation of one of knobs 102 or 112 results in rotation of the other knob as well as steering column 200 in a same rotational direction. The relationship between the rotational directions is schematically represented by arrow CA for knob 102, arrow CB for knob 112 and arrow CC' for steering column 200.

In an embodiment of the disclosure, Twist Controller 100 is operable to provide torque feedback to knob 102 and knob 112. With reference to FIGS. 2A-2B and 3, it will be appreciated that just as rotation of knob 102 or knob 112 causes rotation of steering column 200 due to mechanical coupling via bevel gears, rotation of steering column 200 will cause rotation of knobs 102, 112. Therefore, knob 102 and knob 112 mechanically coupled to steering column 200 is operable to provide torque feedback responsive to a change in the steering of the vehicle. Alternatively or additionally, even in an embodiment where the coupling of knobs 102, 112 to steering of the vehicle is electrical and not mechanical, Twist Controller 100 may comprise an electrical torque actuator (not shown) responsive to the steering of the vehicle operable to apply torque to knob 102 and/or knob 112.

Reference is made to FIGS. 4A-4D, which show knob 102 viewed along rotational axis AL from the knob's distal end towards bevel gear 106 (not shown) and knob 112 viewed along rotational axis AR from the knob's distal end towards bevel gear 116 (not shown).

Assume that knobs 102, 112 are identically shaped, and each knob is indicated with corresponding reference points PL, PR at equivalent locations on the knob. The rotational position of a given reference point may be characterized as being between 0 degrees and 360 degrees, with 0 degrees being defined as the point where the given reference point is vertically highest from the ground, 180 degrees being defined as the point where the given reference is lowest, and 360 degrees being a full revolution.

In an embodiment of the disclosure, an orientation of knobs 102, 112 around their respective axes AL, AR of rotation are offset by 90 degrees, and the offset remains 90 degrees regardless of angular displacement of the knobs around their respective axes of rotation.

Figures 4A, 4B, 4C:
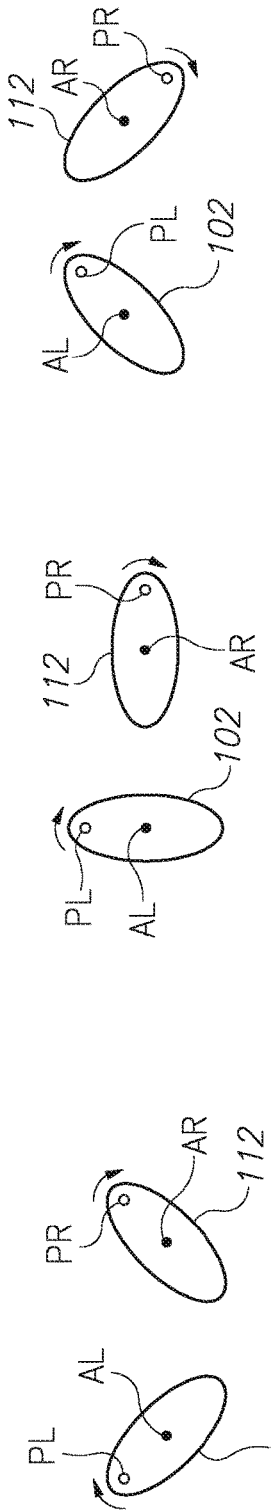
FIGS. 4A-4E shows a schematic illustration of a first rotatable knob and second rotatable knob of a Twist Controller in accordance with an embodiment of the disclosure being rotated, as viewed along each rotatable knob's respective axis of rotation.
Figure 4E:
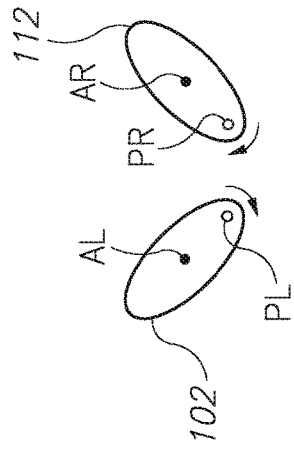
Figure 4D:
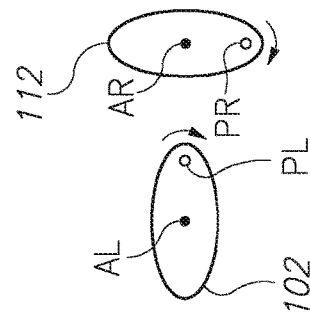

FIGS. 4A-4E shows and exemplary sequence of coordinated rotation of knob 102 and knob 112, with the 90 degree offset between knob 102 and knob 112 being maintained at various rotational positions. FIG. 4A shows reference point PL on knob 102 is at a 315 degree (or a −45 degree) position and reference point PR on knob 112 at a 45 degree position. As shown in FIGS. 4A-4B, if the knob 102 gets rotated CW so that reference point PL is rotated from a 315 degree position to a 0 degrees position, then knob 112 simultaneously rotates such that the reference point PR moves CW from a 45 degree position to a 90 degrees position. As shown in FIGS. 4B-4C, when knob 102 gets rotated so that reference point PL is rotated CW from a 0 degree position to a 45 degrees position, then knob 112 simultaneously rotates such that the reference point PR moves from a 90 degree position to a 135 degrees position. As shown in FIGS. 4C-4D, when knob 102 gets rotated so that reference point PL is rotated CW from a 45 degree position to a 90 degrees position, then knob 112 simultaneously rotates such that the reference point PR moves from a 135 degree position to a 180 degrees position. As shown in FIGS. 4D-4E, when knob 102 gets rotated so that reference point PL is rotated CW from a 90 degree position to a 135 degrees position, then knob 112 simultaneously rotates such that the reference point PR moves from a 180 degree position to a 245 degrees position.

A human hand held out, with the radial styloid as a reference point for determining angular position and 0 degrees being the highest vertical point, is configured to easily rotate between about −45 degree and about 45 degree positions. As shown in FIGS. 4A-4E, knob 102 and knob 112 are shaped having order 2 rotational symmetry such that the knob has a same appearance after being rotated 180 degrees around the rotation axis, and is flattened in shape. Due to the shape of knob 102, knob 102 is positioned to be advantageously rotated by a driver when reference point PL of knob 102 is positioned between the −45 degree and 45 degree positions or between about the 135 degree and 225 degree positions. The above is also the case for knob 112.

In an embodiment of the disclosure, when knob 102 is rotated by the user's left hand from the knob's −45 degree position to 45 degree position (FIG. 4A to FIG. 4C), knob 112 becomes positioned to be in the 135 degree position, and thus positioned to be advantageously rotated by the user's right hand. After knob 112 is rotated from the knob's 135 degree position to 225 degree position (FIG. 4C to FIG. 4E), knob 102 becomes positioned to be in the 135 degree position, and thus positioned to be advantageously rotated by the user's left hand. As a result, each time a driver completes a rotation of one knob within the anatomical range of easy wrist rotation, the other knob is advantageously positioned for easy rotation by the other hand.

Figure 5:
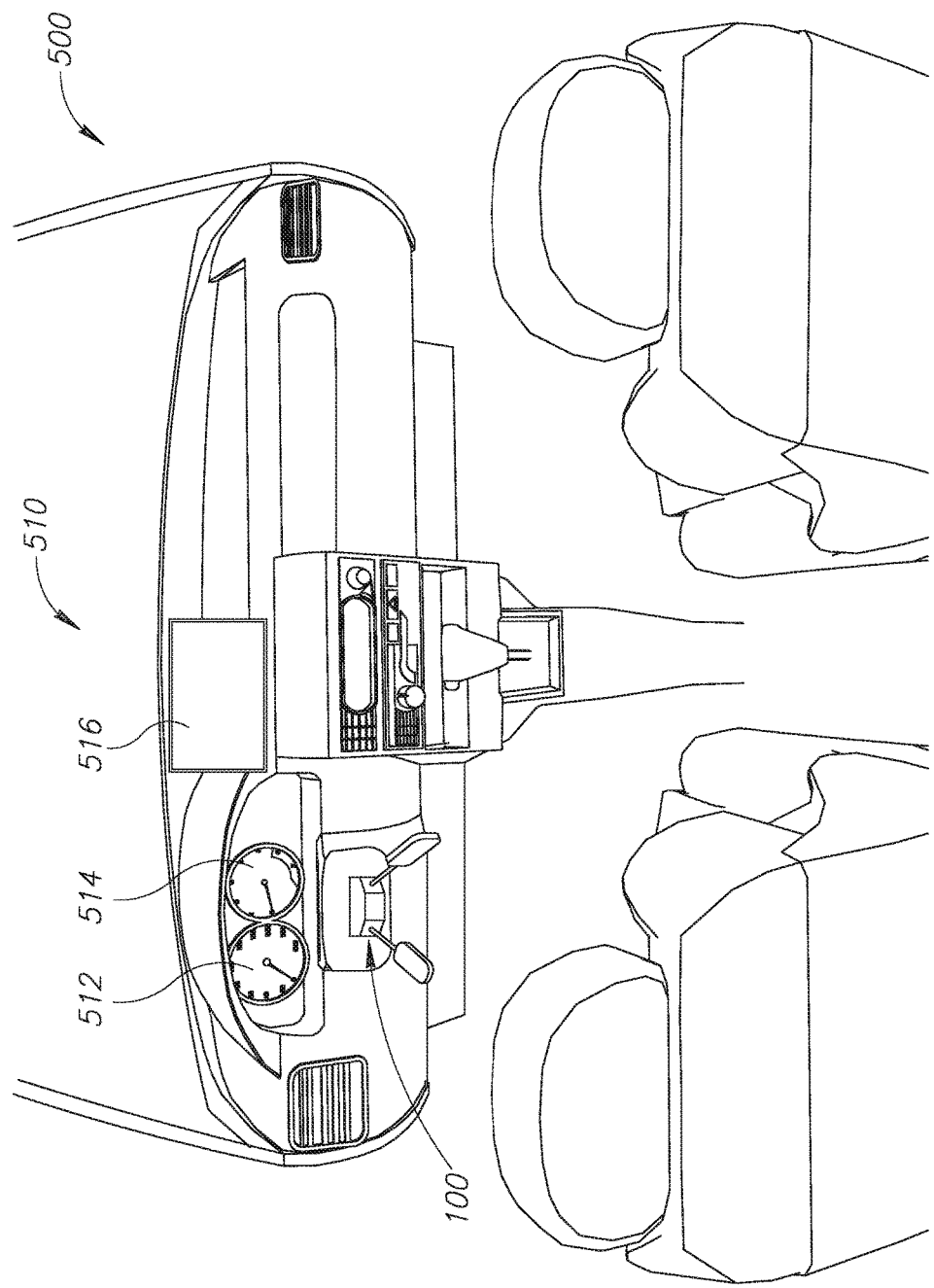
FIG. 5 shows a schematic illustration of a Twist Controller in accordance with an embodiment of the disclosure installed in a vehicle.

Reference is now made to FIG. 5, which schematically shows automobile 500 comprising Twist Controller 100. In an embodiment of the disclosure, Twist Controller 100 is dimensioned to be less obstructive to a driver compared to a typical steering wheel. By way of example, Twist Controller 100, compared to a typical steering wheel, is less obstructive of the driver's view of dashboard 510 and it's components, by way of example dials 512, 514 and flatscreen display 516, and is less likely to strike a driver's knees when the driver is entering or exiting automobile 500. In an embodiment of the disclosure, orientation of Twist Controller 100 with respect to dashboard 510 may be adjustable in order to improve drive comfort while using the Twist Controller to steer automobile 500, or to improve clearance to allow the driver to more easily exit and enter the vehicle. In an embodiment of the disclosure, Twist Controller 100 may be configured to be made further unobtrusive when not in use, by way of example when vehicle 500 is not being driven or when vehicle 500 is being controlled by a computer-based autonomous driving system. Optionally, the knobs may be configured to be shortened or collapsed to be flat against dashboard 510 when not in use. Optionally, Twist controller 100 may be kept inside an indentation or a compartment within dashboard 510 when not in use, and slid or ejected out, beyond the surface of dashboard 510, when use of the Twist Controller is needed or desired by the driver. The location for mounting Twist Controller 100 in the present disclosure is not limited to the mounting location as shown in FIG. 5, especially in an embodiment where the Twist Controller comprises an electronic rotation controller configured to register rotation of one or both knobs to control powered rotation of the steering column responsive to knob rotation, and thus it is not required to be mechanically coupled to a steering column. By way of example, Twist Controller 100 may be mounted on the driver's seat or the ceiling. Alternatively, Twist Controller 100 may be a stand-alone device that is operatively connectable to vehicle 500 through a wire or wireless connection.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A vehicle steering input device comprising:
   a first knob configured to be rotatable around a first axis of rotation and operatively coupled to a steering column so that rotating the first knob results in rotation of the steering column; and
   a second knob configured to be rotatable around a second axis of rotation and operatively coupled to rotate the steering column so that rotating the second knob results in rotating the steering column,
   wherein:
   the first and second rotatable knobs are operatively coupled so that rotating one knob in a clockwise (CW) or counter clockwise (CCW) direction results in rotating the other knob in a same direction; and
   the first axis of rotation and the second axis of rotation define an angle.

2. The vehicle steering input device according to claim 1, wherein the angle formed between the first and second axes of rotation is between 180 degrees and 10 degrees.

3. The vehicle steering input device according to claim 2, wherein the angle is between 170 degrees and 10 degrees, between 160 degrees and 20 degrees, between 150 degrees and 30 degrees, between 140 degrees and 40 degrees, between 130 degrees and 50 degrees, between 120 degrees and 60 degrees, between 110 degrees and 70 degrees, or about 90 degrees.

4. The vehicle steering input device according claim 1, wherein the orientation of the first and second knobs around their respective axes of rotation are offset by 90 degrees with respect to each other, and the offset remains 90 degrees regardless of the angular position of the first and second rotatable knobs about their respective axes of rotation.

5. The vehicle steering input device according to claim 1, wherein rotation of the first and second knobs are mechanically coupled to rotation of the steering column.

6. The vehicle steering input device according to claim 1, further comprising an electronic rotation controller configured to register rotation of one or both knobs and control powered rotation of the steering column responsive to knob rotation.

7. The vehicle steering input device according to claim 1, further comprising an electrical feedback actuator that applies torque to the first and/or second knobs responsive to force applied to the steering mechanism.

8. The vehicle steering input device according to claim 1, wherein for at least one of the first and second knobs, a distal portion of the knob is characterized by a rounded shape relative to a proximal portion of the knob.

9. A vehicle steering input device comprising:
  a first knob configured to be rotatable around a first axis of rotation and operatively coupled to a steering column so that rotating the first knob results in rotation of the steering column; and
  a second knob configured to be rotatable around a second axis of rotation and operatively coupled to rotate the steering column so that rotating the second knob results in rotating the steering column,
wherein:
  the first and second knobs are operatively coupled so that rotating one knob in a CW or CCW direction results in rotating the other knob in a same direction; and
  the orientation of the first and second knobs around their respective axes of rotation are offset by 90 degrees with respect to each other, and the offset remains 90 degrees regardless of the angular position of the first and second rotatable knobs about their respective axes of rotation.

10. The vehicle steering input device according to claim 9, wherein the first axis of rotation and the second axis of rotation define an angle.

11. The vehicle steering input device according to claim 10, wherein an angle formed between the first and second axes of rotation is between 180 degrees and 10 degrees.

12. The vehicle steering input device according to claim 11, wherein the angle is between 170 degrees and 10 degrees, between 160 degrees and 20 degrees, between 150 degrees and 30 degrees, between 140 degrees and 40 degrees, between 130 degrees and 50 degrees, between 120 degrees and 60 degrees, between 110 degrees and 70 degrees, or about 90 degrees.

13. The vehicle steering input device according to claim 9, wherein rotation of the first and second knobs are mechanically coupled to rotation of the steering column.

14. The vehicle steering input device according to claim 9, further comprising an electronic rotation controller configured to register rotation of one or both knobs and control powered rotation of the steering column responsive to knob rotation.

15. The vehicle steering input device according to claim 9, further comprising an electrical feedback actuator that applies torque to the first and/or second knobs responsive to force applied to the steering mechanism.

16. The vehicle steering input device according to claim 9, wherein for at least one of the first and second knobs, a distal portion of the knob is characterized by a rounded shape relative to a proximal portion of the knob and the proximal portion of the knob has a flattened shape relative the distal portion.

* * * * *